United States Patent
Miller (10) Patent No.: US 10,082,263 B2
(45) Date of Patent: Sep. 25, 2018

(54) LIGHTING ASSEMBLY FOR USE ON A VEHICLE

(71) Applicant: Valeo North America, Inc., Seymour, IN (US)

(72) Inventor: Patrick Franklin Miller, Richmond Township, MI (US)

(73) Assignee: VALEO NORTH AMERICA, INC., Seymour, IN (US)

( * ) Notice: Subject to any disclaimer, the term of this patent is extended or adjusted under 35 U.S.C. 154(b) by 0 days.

(21) Appl. No.: 15/279,530

(22) Filed: Sep. 29, 2016

(65) Prior Publication Data

US 2018/0087734 A1 Mar. 29, 2018

(51) Int. Cl.
| | |
|---|---|
| F21V 9/00 | (2018.01) |
| F21S 41/24 | (2018.01) |
| F21S 8/10 | (2006.01) |
| B60Q 1/04 | (2006.01) |
| F21S 41/30 | (2018.01) |
| F21V 19/00 | (2006.01) |
| F21V 17/00 | (2006.01) |
| F21V 7/00 | (2006.01) |

(52) U.S. Cl.
CPC ............ *F21S 41/24* (2018.01); *B60Q 1/0433* (2013.01); *F21S 41/30* (2018.01); *F21S 48/1241* (2013.01); *F21S 48/13* (2013.01); *F21V 17/005* (2013.01); *F21V 19/0035* (2013.01); *F21V 7/005* (2013.01)

(58) Field of Classification Search
CPC .. B60Q 1/0408; B60Q 1/0433; B60Q 1/0483; F21S 48/1104; F21S 48/1241; F21S 48/13; F21V 7/005
See application file for complete search history.

(56) References Cited

U.S. PATENT DOCUMENTS

| | | | | |
|---|---|---|---|---|
| 2002/0071268 A1* | 6/2002 | Pederson | ............. | B60Q 1/2611 362/35 |
| 2004/0041984 A1* | 3/2004 | Tani | ....................... | F21V 7/0091 353/20 |
| 2004/0057027 A1* | 3/2004 | Tani | ................... | G03B 21/2033 353/102 |
| 2011/0096562 A1* | 4/2011 | Lambert | .................. | B60Q 1/20 362/545 |
| 2011/0194287 A1* | 8/2011 | Georgitsis | ............ | B60Q 1/0483 362/277 |
| 2013/0128572 A1* | 5/2013 | Yoshizawa | ................ | F21V 7/00 362/235 |
| 2014/0218951 A1* | 8/2014 | Takada | ................ | F21S 48/1291 362/511 |
| 2015/0124469 A1* | 5/2015 | Krenn | .................. | F21S 48/1154 362/511 |
| 2015/0192264 A1* | 7/2015 | Holzl | ................... | F21S 48/1154 362/511 |

* cited by examiner

*Primary Examiner* — Alexander Garlen
(74) *Attorney, Agent, or Firm* — Oblon, McClelland, Maier & Neustadt, L.L.P.

(57) ABSTRACT

A vehicle lighting system or assembly is shown. A lighting system or assembly comprises a reflector, a light bar for mounting on the reflector, a light pipe adapted to be mounted on the reflector and a bracket for securing to the reflector. The light pipe, the light bar and the reflector comprise locators or locating means for causing the components to become registered in a predetermined position when the components of the system are assembled.

22 Claims, 8 Drawing Sheets

LIGHTING ASSEMBLY FOR USE ON A VEHICLE

BACKGROUND OF THE INVENTION

1. Field of the Invention

This invention relates to a lighting assembly, and more particularly to a lighting assembly having improved light bar attachment and optical integration.

2. Description of the Related Art

In the field of vehicle lighting, light bars and light pipes are often used in headlamp assemblies to provide one or more lighting functions, such as headlamp lighting functions, turn signal functions, side light and/or daytime running light functions. One difficulty with light bars and light pipe designs of the past is the attachment methods that were used to affix these components to the bezel or housing of the headlamp. For example, it was not uncommon that the light bars had small load-bearing surfaces or flanges formed in the light bar at locations that were far from the center of gravity of the light bar. Normal vibration from the vehicle could sometimes cause fatigue or failure at the point where the flanges or surfaces were fixed to the bezel or housing.

It was also not uncommon that the light bar assembly to have large gaps to bezels and other internal parts for assembly loading into the lamp. This design will help reduce the gaps around the light bar for a more styled and uniform appearance.

The optics and the material from which the light bars were manufactured, such as Polymethyl methacrylate (PMMA) or polycarbonate (PC), also created unique problems. For example, PMMA light bars could not be held by screws and polycarbonate light bars had a lower optical efficiency. For those light bars that could be used with conventional fasteners or screws, the attachments were typically far away from the center of gravity (CG) of the light bar which made fatigue and failure risk high during vibration.

Another problem with light bar assemblies of the past is that they were often used with light pipes and it was often difficult to register the light bar with respect to the light pipes and/or register either the light bar or the light pipe with respect to a reflector.

What is needed therefore, is a system and method for overcoming one or more of the problems of the prior art.

SUMMARY OF THE INVENTION

One object of the invention is to provide an improved lighting assembly that overcomes one or more of the problems described herein.

Another object of the invention is to provide a light bar that is uninterrupted and continuous and that reduces or eliminates the need for small load-bearing surfaces.

Another object of the invention is to provide an attachment system and method that affixes a light bar to a bezel or housing without using small load bearing surfaces.

Still another object of the invention is to provide an attachment assembly and method that registers a light bar relative to a reflector.

Still another object is to provide a system and method of attachment that causes a light bar to be registered with respect to a light pipe which provides light to the light bar.

Still another object of the invention is to provide an attachment system and method for registering both registering a light pipe relative to a reflector and/or the light bar.

Still another object of the invention is to reduce or eliminate large gaps between the bezel or housing of the headlamp assembly and the light bar.

Another object is to provide an attachment system and method for a light bar and light pipe that eliminates the need for affixing the light bar to a bezel or a housing using conventional fasteners, such as screws.

Yet another object is to provide an attachment system and method that places areas where the light bar is affixed to the bezel or housing closer to its center of gravity thereby reducing or eliminating fatigue or failure risk associated with vibration.

Another object is to provide an attachment assembly for a light bar and light pipe that reduces or eliminates the need for fasteners, such as screws, to directly engage the light bar or light pipe.

Another object is to provide a reflector that comprises at least one or a plurality of parts that trap or clamp a light bar and/or light pipe on a reflector that can be used to mount the light bar on a bezel or housing of a headlamp assembly.

Another object is to provide an attachment assembly and method that causes: a light pipe to be registered relative to a reflector, a light bar to be registered relative to a reflector, a light pipe registered relative to a light bar when they are mounted on a reflector.

Another object is to provide an attachment system and method that optically registers a light pipe relative to an input surface of a light bar.

In one aspect, one embodiment of the invention comprises a lighting assembly comprising a reflector; a light bar for mounting on the reflector; a light pipe for mounting on the reflector; and a bracket for securing to the reflector, the light pipe, the light bar and the reflector becoming registered in a predetermined position when the bracket is mounted on the reflector.

In another aspect, another embodiment of the invention comprises a lighting assembly comprising a reflector, a light bar for mounting on the reflector, a light pipe for mounting on the reflector, and a bracket for securing both the light pipe and the light bar to the reflector, such that the light pipe, the light bar and the reflector becomes registered together in a predetermined position.

This invention, including all embodiments shown and described herein, could be used alone or together and/or in combination with one or more of the features covered by one or more of the following list of features:

- The lighting assembly wherein the reflector, the light bar, the bracket and the light pipe are arranged on top of each other and/or are stacked relative to one another in a generally vertical or generally horizontal plane. In one embodiment, the assembly is arranged in the following order: the reflector, the light bar, the bracket and then the light pipe.
- The lighting assembly wherein the reflector comprises a first locator adapted to receive at least a first portion of the light bar.
- The lighting assembly wherein the first locator comprises a first elongated channel, the at least a first portion of the light bar comprises a clamping rib integrally formed in the light bar and configured to be received in the first elongated channel.
- The lighting assembly wherein the bracket comprises a second locator adapted to receive at least a second portion of the light bar.

The lighting assembly wherein the second locator comprises a second elongated channel formed in the bracket, the at least a second portion of the light bar comprises a second clamping rib integrally formed in the light bar and configured to be received in the second elongated channel.

The lighting assembly wherein the bracket comprises a second locator adapted to receive at least a second portion of the light bar.

The lighting assembly wherein the second locator comprises a second elongated channel formed in the bracket, the at least a second portion of the light bar comprises a second clamping rib integrally formed in the light bar and configured to be received in the second elongated channel.

The lighting assembly wherein the first elongated channel comprises at least one tuning rib for engaging the first portion of the light bar when the first portion is receiving in first light bar clamping channel and adapted to register the light bar in the predetermined position.

The lighting assembly wherein the first elongated channel comprises a plurality of tuning ribs for engaging the clamping rib of the light bar when the clamping rib is received in first light bar clamping channel and adapted to register the light bar in the predetermined position.

The lighting assembly wherein the lighting assembly comprises a third locator for locating the light pipe in the predetermined position.

The lighting assembly wherein the third locator comprises a first light pipe locator integral with the light pipe; a second light pipe locator integral with the reflector; the first and second light pipe locators cooperating to locate the light pipe on the reflector so that the light pipe becomes registered relative to the reflector and the light bar after the bracket is mounted on the reflector.

The lighting assembly wherein the first light pipe locator comprises a first tab or projection integrally formed in the light pipe and the second light pipe locator comprises an opening in the reflector that is adapted to receive the first tab or projection.

The lighting assembly wherein the first light pipe locator comprises a second tab or projection having a slot, the second light pipe locator comprising a projection adapted to be received in the slot to register the light pipe to the reflector.

The lighting assembly wherein the first light pipe locator comprises a second tab or projection having a slot, the second light pipe locator comprising a reflector projection adapted to be received in the slot to register the light pipe to the reflector.

The lighting assembly wherein the second tab or projection comprises a light bar locator for engaging the light bar when the light bar is mounted on the reflector and for locating the light bar relative to the light pipe.

The lighting assembly wherein the light bar comprises a slotted light bar projection adapted to receive the reflector projection.

The lighting assembly wherein second tab or projection comprises at least one surface that defines a stop against which the slotted light bar projection may abut to register the light bar to the light pipe.

The lighting assembly wherein the light bar comprises a slotted light bar projection adapted to receive the reflector projection in order to register the light bar relative to the reflector and the light pipe.

The lighting assembly wherein the light bar comprises a plurality of light bar locating projections that are received in a plurality of openings, respectively, in at least one of the reflector or the bracket in order to register the light bar in the predetermined position.

The lighting assembly wherein when light pipe and the light bar are mounted on the reflector and the bracket is fixed to the reflector, the light pipe, the light bar and the reflector all become registered in the predetermined position in the assembly.

The lighting assembly wherein the light bar comprises a first wall and a generally opposing second wall, the first and second walls being non-parallel.

The lighting assembly wherein light bar is at least one of generally T-shaped or generally L-shaped in cross section.

These and other objects and advantages of the invention will be apparent from the following description, the accompanying drawings and the appended claims.

DETAILED DESCRIPTION OF THE PREFERRED EMBODIMENTS

Referring now to FIGS. 1-8C, an embodiment of a lighting assembly 10 for use on a vehicle V is shown. FIGS. 2A-2B illustrate a perspective view of the assembled form of the lighting assembly 10. The lighting assembly 10 is mounted to a bezel or housing 11 of a headlamp or tail lamp assembly 13.

The lighting assembly 10 comprises a reflector 12, a light bar 14 adapted to be mounted on the reflector 12, a light pipe 16 adapted to be mounted on the reflector 12 and a bracket 18 that is also adapted to be mounted on the reflector 12 as shown. One advantageous feature of the embodiment being described is that when the bracket 18 is mounted on the reflector 12, the various components, such as the light bar 14 and light pipe 16, become captured or trapped in area 15 (FIG. 2A) by the reflector 12 and bracket 18 and these components become mounted between the reflector 12 and the bracket 18 and become automatically registered with respect to each other and with respect to the reflector 12. Note that this is accomplished without separate mounting screws or fasteners on the light bar 14 or the light pipe 16 of the type required in the prior art.

Figure 4A:
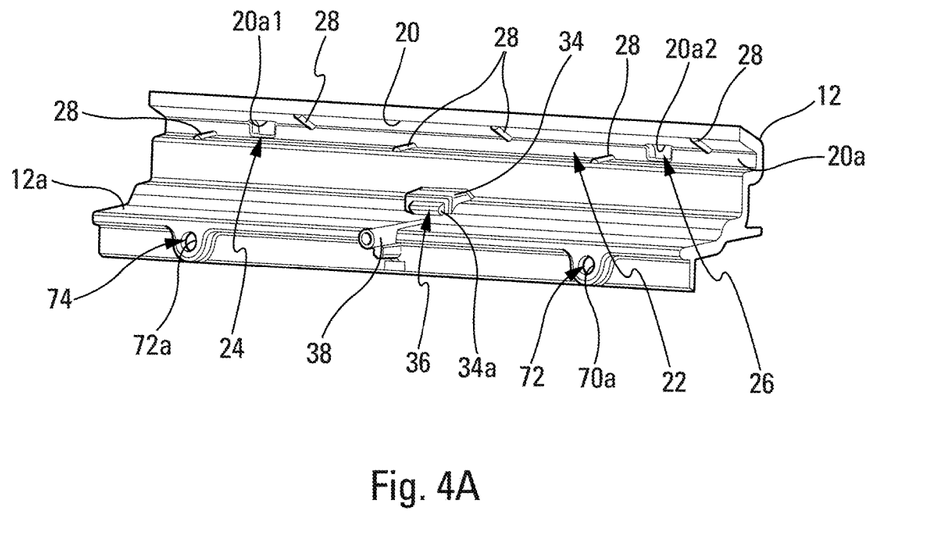
FIGS. 4A and 4B are perspective views showing various details of a reflector used in the lighting assembly.
Figure 4B:
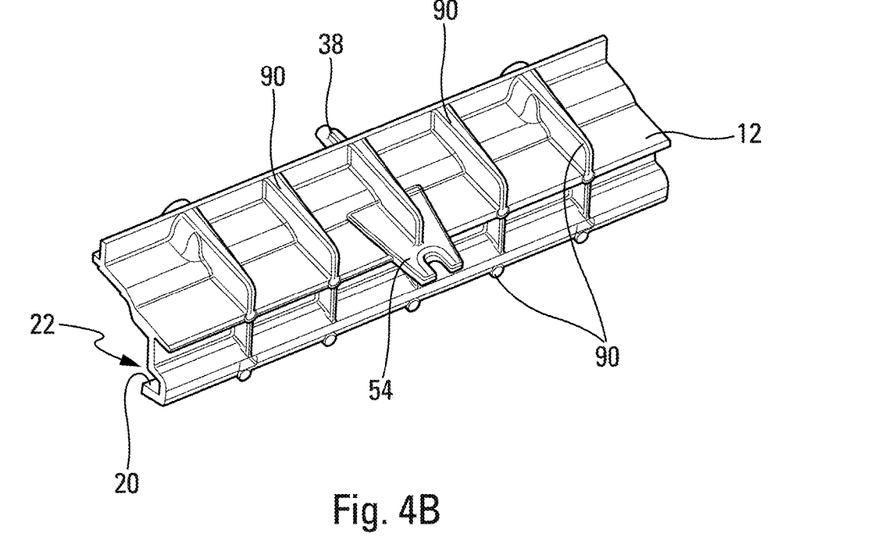
Figure 6A:
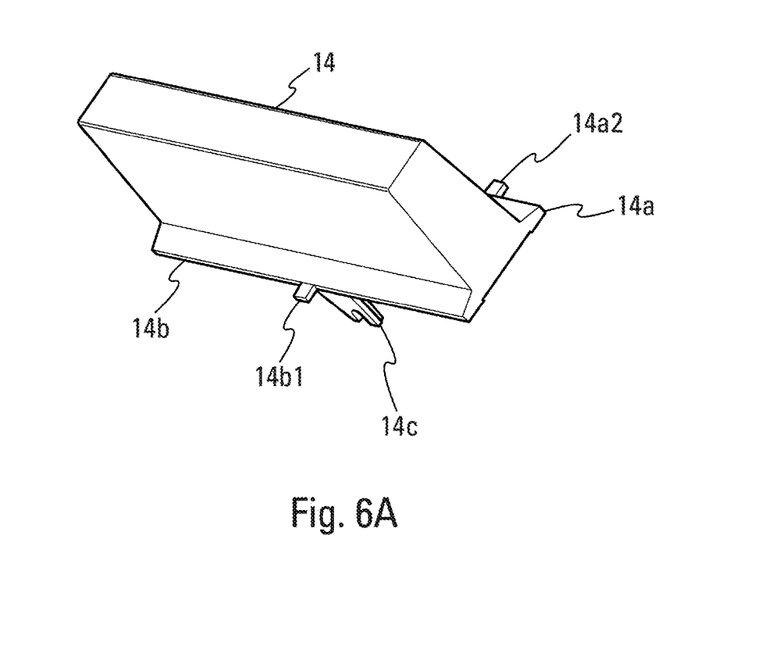
FIGS. 6A-6D are various perspective and/or fragmentary views of a light bar used in the lighting assembly.
Figure 6B:
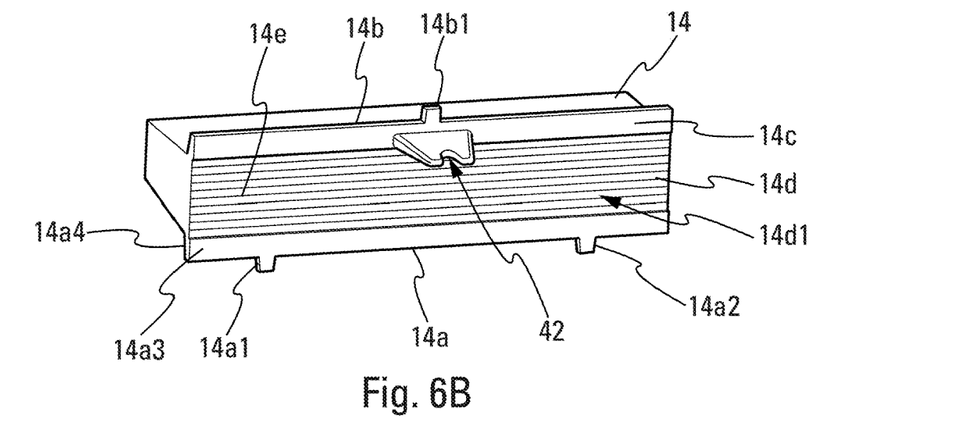
Figure 6C:
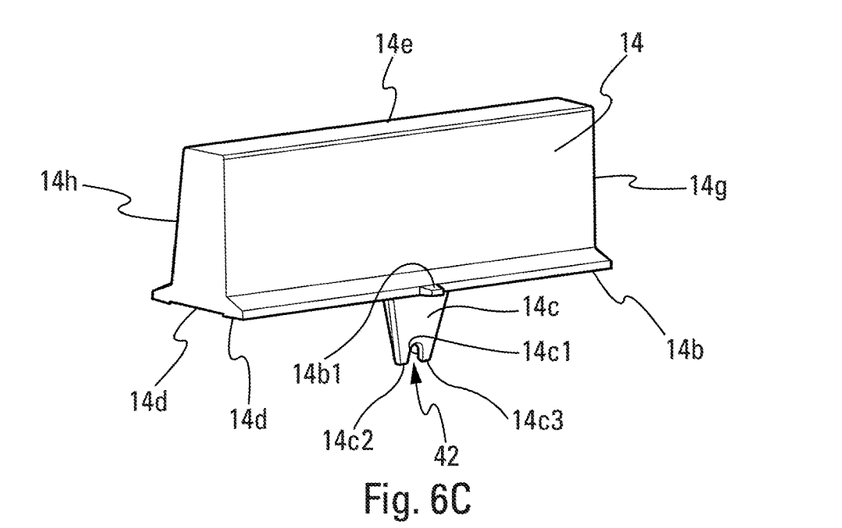
Figure 6D:
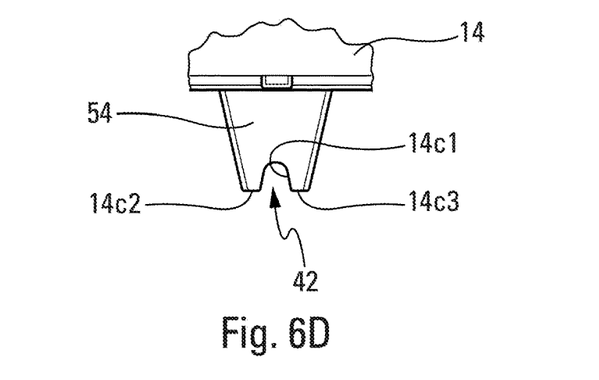

Referring now to FIGS. 4A-4B, features of the reflector 12 will now be described. The reflector 12 is a one-piece molded construction having a reflective surface 12a that has been metalized or otherwise processed to be reflective. The reflector 12 comprises a first generally U-shaped wall 20 that defines a first elongated channel 22 for receiving at least a portion of the light bar 14, such as a first clamping rib 14a (FIG. 6B) as will be described later herein. In the illustration being described and as illustrated in FIG. 6B, note that the light bar 14 comprises the first clamping rib 14a and a generally opposed second claiming rib 14b that is received on the bracket 18. As will be described later herein, the first clamping rib 14a comprises at least one or a plurality of projections or tabs 14a1 and 14a2, and the second clamping rib 14b comprises at least one projection or tab 14b1 in the illustration. It should be understood that more or fewer projections or tabs 14a1, 14a2 and 14b1 could be provided.

Returning to FIG. 4A, note that a surface 20a of the generally U-shaped wall 20 comprises a first wall 20a1 and a second wall 20a2, which define a first locating aperture 24 and a second locating aperture 26, respectively. In the illustration being described, the first clamping rib 14a is positioned in the first elongated channel 22 and the projections or tabs 14a1 and 14a2 are received in the locating apertures 24 and 26, respectively, in order to provide means for locating and registering the light bar 14 in the reflector 12 longitudinally.

Note that the generally U-shaped wall 20 comprises at least one or a plurality of tuning ribs 28 for engaging the first clamping rib 14a when the light bar 14 is mounted in the reflector 12. In the illustration being described, the tuning ribs 28 engage the surfaces 14a3 and 14a4 of the first clamping rib 14a to engage and clamp the first clamping rib 14a in the first elongated channel 22 and to facilitate registering the light bar 14 on the reflector 12.

Note that the second clamping rib 14b comprises the projection or tab 14b1 that is received in an aperture 30 (FIGS. 7A-7C) defined by an aperture wall 32 in the bracket 18. Thus, the aperture 30 and the at least one projection or tab 14b1 cooperate to provide another locator or means for locating to accurately locate and trap the light bar 14 in the reflector 12 and lighting assembly 10.

Figure 3:
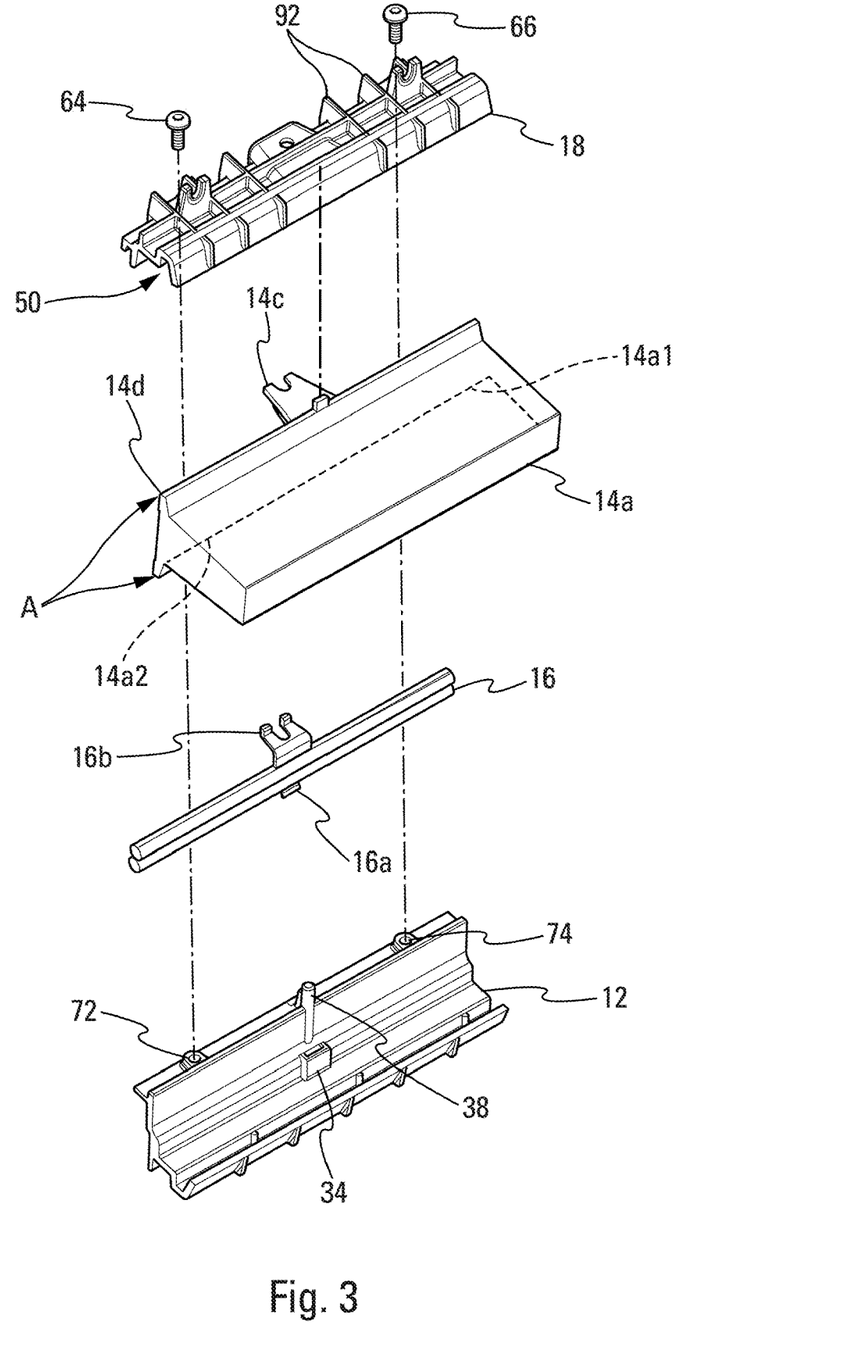
FIG. 3 is an exploded view showing the various components of the lighting assembly.

The reflector 12 (FIG. 4A) further comprises an integrally molded light pipe mount 34 having a wall 34a that defines a light pipe mount aperture 36 as best illustrated in FIG. 4A. The light pipe mount aperture 36 defines a female opening for receiving a locating tab or projection 16a (FIG. 5) of the light pipe 16. The reflector 12 further comprises a light pipe and light bar locator 38 that is integral with, monolithic or secured to the reflector 12 as best illustrated in FIGS. 3 and 4A-4B. It should be understood that the light pipe and light bar locator 38 is adapted and cooperate with a light bar locating flange 14c (FIGS. 6A-6D) of the light bar 14 and a light pipe locating flange 16b (FIG. 5) of the light pipe 16, both of which will be described later herein, to further locate or register these components with respect to the reflector 12 and with respect to each other.

Accordingly, the light pipe mount aperture 36 (FIG. 4A) on the reflector 12 receives the locating tab or projection 16a to provide means for registering and locating the light pipe 16 on the reflector 12. In this regard, the light pipe locating flange 16b comprises a generally U-shaped wall 16b1 that defines an aperture 40 that receives the light pipe and light bar locator 38. During assembly and as will be described in more detail later herein, the light pipe 16 is situated (FIG. 8A) on the reflector 12 by guiding the tab or projection 16a into the light pipe mount aperture 36 of the mount 34 and situating and causing the aperture 40 to receive the light pipe and light bar locator 38. Thereafter, the light bar 14 is mounted on the reflector 12 by guiding the projections or tabs 14a1 and 14a2 into their respective mating apertures 24 and 26, respectively, in the first elongated channel 22 of the reflector 12. The light bar locating flange 14c (FIG. 6D) comprises a generally U-shaped wall 14c1 that defines the aperture 42 that also receives the light pipe and light bar locator 38. Note that the light bar locating flange 14c (FIG. 6C) is situated and rests on the surface of the locating flange 16b (FIG. 5) of the light pipe 16.

Figure 5:
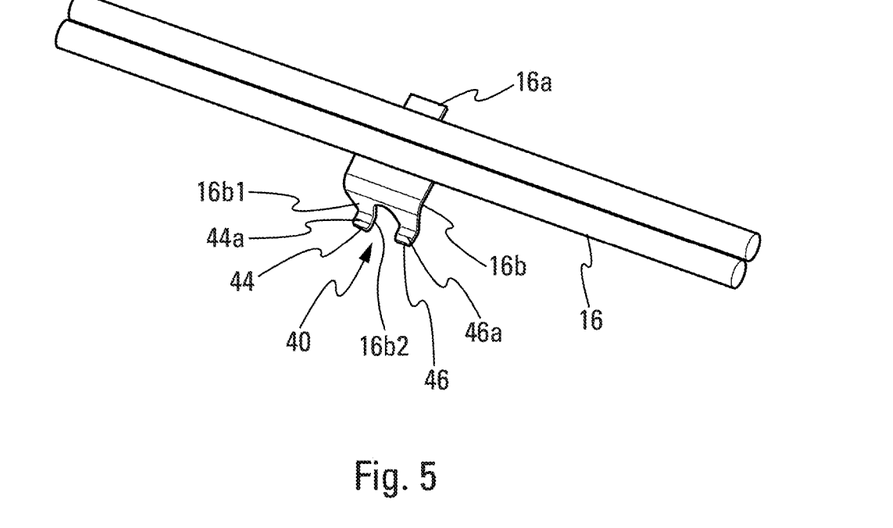
FIG. 5 is a perspective view of a light pipe used in the lighting assembly.
Figure 8A:
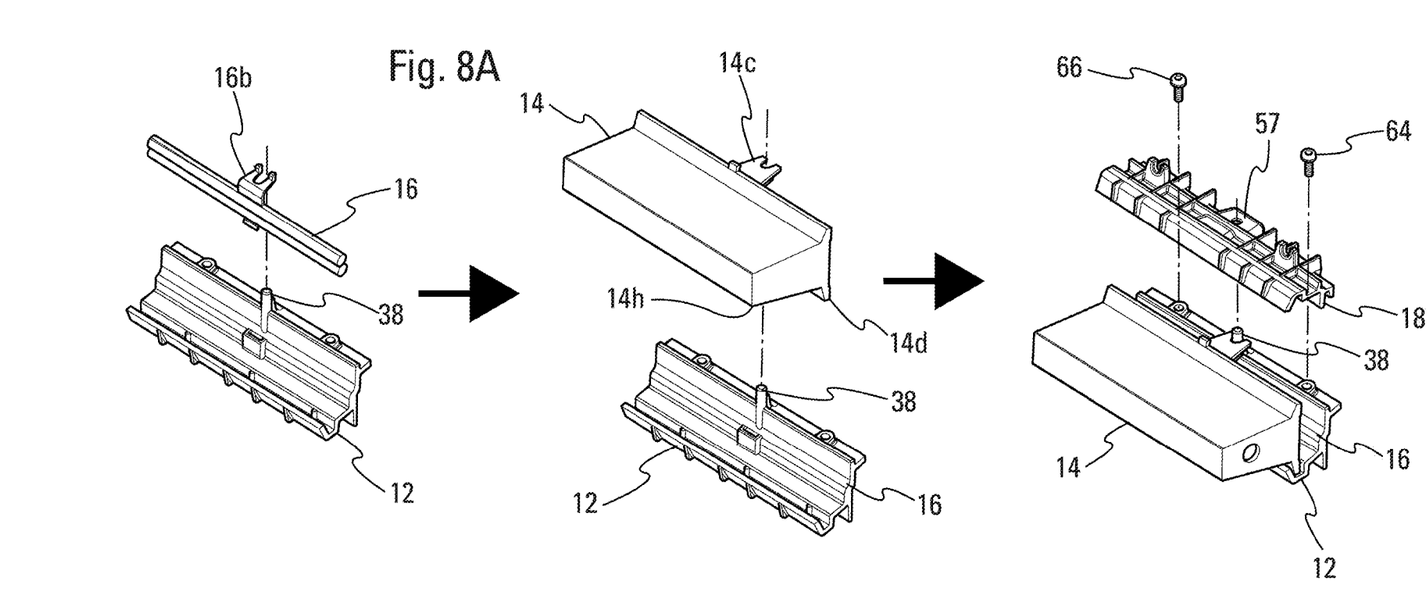
FIG. 8A is a progressive view illustrating a method or procedure for assembling the various components of the lighting assembly.
Figure 8B:
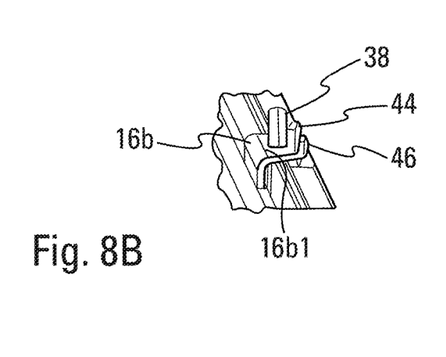
FIGS. 8B and 8C are fragmentary views showing a light pipe flange and light bar flange (FIG. 8C) receipt of a light pipe and light bar mounting post for facilitating registration of the light bar, light pipe and reflector with respect to each other.
Figure 8C:
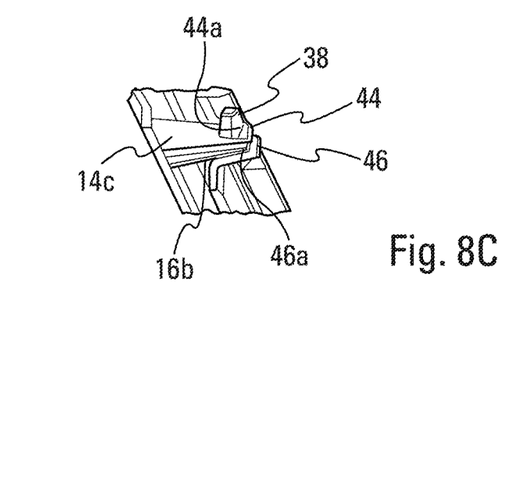

In the illustration being described, the light pipe locating flange 16b is generally L-shaped in cross section and comprises at least one or a plurality of projections, abutments or stops 44 and 46 (FIGS. 5 and 8C). As best illustrated in FIG. 8C, once the light pipe 16 is mounted on the reflector 12 in the manner described herein, the light pipe locating flange 16b provides a locator for locating the light bar 14 thereon and on the reflector 12. The projections or stops 44 and 46 comprise surfaces 44a and 46a that each define an abutment or stop against which the surfaces 14c2 and 14c3 of the light bar locating flange 14c may abut to provide another means of registering the light bar 14 to the light pipe 16 and the reflector 12.

Advantageously, the first elongated channel 22 and the locating projections or tabs 14a1 and 14a2 are received in the apertures 24 and 26, respectively, to provide a first locator or registration means. The light bar locating flange 14c and its associated aperture 42, when received on the light pipe and light bar locator 38, also provides a locating and registration means for further locating and registering the light bar 14 on the light pipe 16 and the reflector 12. It is important to note that once the light pipe 16 and light bar 14 are received and mounted on the reflector 12, they automatically become registered relative to each other and relative to the reflective surface 12a of the reflector 12. As mentioned, the surface 12a has a reflective coating or metalization in order to reflect light from the light pipe 16 toward the light bar 14 once the lighting assembly 10 is assembled. Note, for example, in FIGS. 2A and 2B, that a light entry surface 14d is situated in a predetermined position in the lighting assembly 10 such that the light entry surface 14d is located a predetermined distance D from the surface 12a of the reflector 12 as best illustrated in FIG. 2B. Thus, one advantageous feature of the illustration being described is that it comprises automatic locators and means for registering the various components of the lighting assembly 10 relative to each other and relative to the reflector 12.

As best illustrated in FIGS. 2A-2B, 3 and 8A, the lighting assembly 10 is assembled by first placing the light pipe 16 on the reflector 12 as described herein. Next, the light bar 14 is mounted on the reflector 12 utilizing the locating tabs 14a1 and 14a2 that are received in the first and second locating apertures 24 and 26, respectively. As mentioned earlier, the light pipe locating flange 16b of the light pipe 16 is positioned on the light pipe and light bar locator 38, as shown in FIG. 8B. Thereafter, the first clamping rib 14a of the light bar 14 is received in the first elongated channel 22 of the reflector 12 and the light bar locating flange 14c of the light bar 14 is pivoted and guided toward the light pipe and light bar locator 38 such that the aperture 42 is also received on the light pipe and light bar locator 38. The surfaces 14c2 and 14c3 are caused to engage or abut against the surfaces 44a and 46a, respectively, of the projections or stops 44 and 46 as illustrated in FIG. 8C.

Once the light pipe 16 and light bar 14 are mounted on the reflector 12, the bracket 18 (FIG. 7A) is guided onto the assembled parts. In this regard, note that the bracket 18 comprises a generally U-shaped interior wall 18a that defines a second elongated channel 50. The second elongated channel 50 receives the second clamping rib 14b (FIGS. 6A-6B) of the light bar 14. Note that the generally U-shaped interior wall 18a comprises a plurality of tuning ribs 52 that cooperate to guide and locate the second clamping rib 14b in the second elongated channel 50. The second clamping rib 14b comprises the at least one projection or tab 14b1 that is received in an aperture 30 in the generally U-shaped interior wall 32. The bracket 18 also comprises a bracket flange 57 having a flange aperture 57a that receives the light pipe and light bar locator 38. This assembly causes the bracket 18, light pipe 16, the light bar 14 and the reflector 12 to automatically be located or registered in a desired or predetermined position in the second elongated channel 50.

Figure 7A:
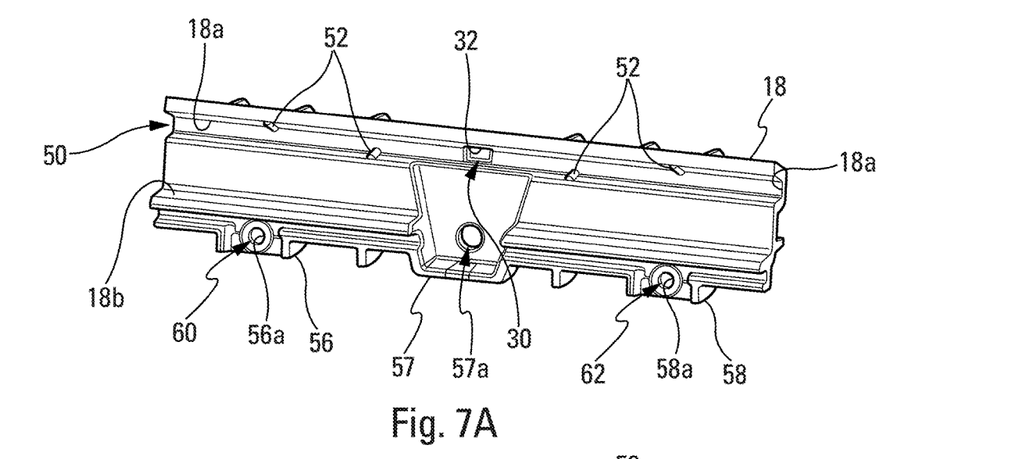
FIGS. 7A-7C are various perspective views of a bracket used in the lighting assembly.
Figure 7B:
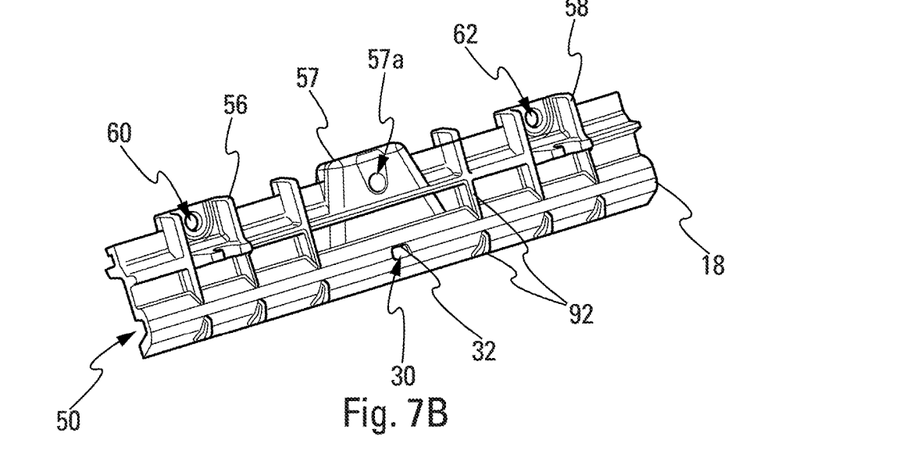
Figure 7C:
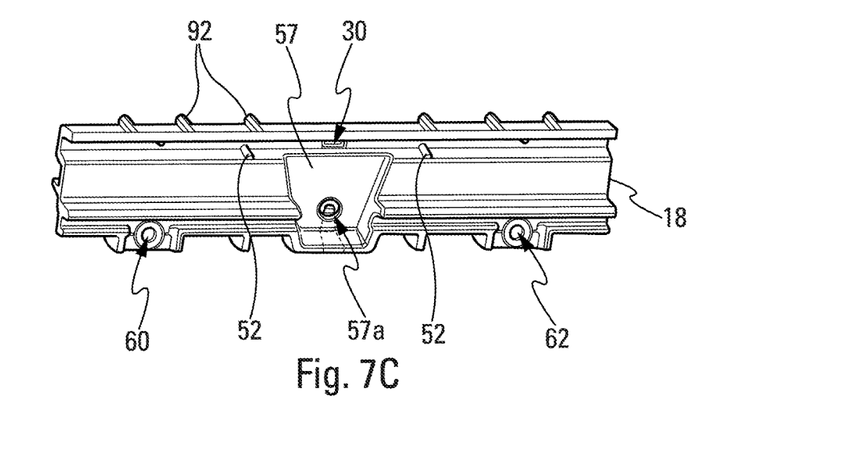

Referring to FIGS. 7A-7B, the bracket 18 comprises a plurality of mounting tabs or flanges 56 and 58 having generally circular walls 56a and 58a, respectively, that define apertures 60 and 62 for receiving fasteners or screws 64 (FIG. 3) and 66, respectively. Note in FIG. 4A, that the reflector 12 comprises a plurality of mounting tabs 68 and 70 that have a generally circular wall 68a and 70a that define apertures 72 and 74, respectively. In the illustration being described, the fasteners or screws 64 and 66 are inserted in the apertures 60 and 62 and screwed into the mating apertures 72 and 74, as best illustrated in FIG. 3, to secure the bracket 18 to the reflector 12, thereby capturing the light pipe 16 and light bar 14 therebetween. Once assembled, the lighting assembly 10 can be mounted on the headlamp or tail lamp assembly 13 and mounted onto the vehicle V.

Figure 1:
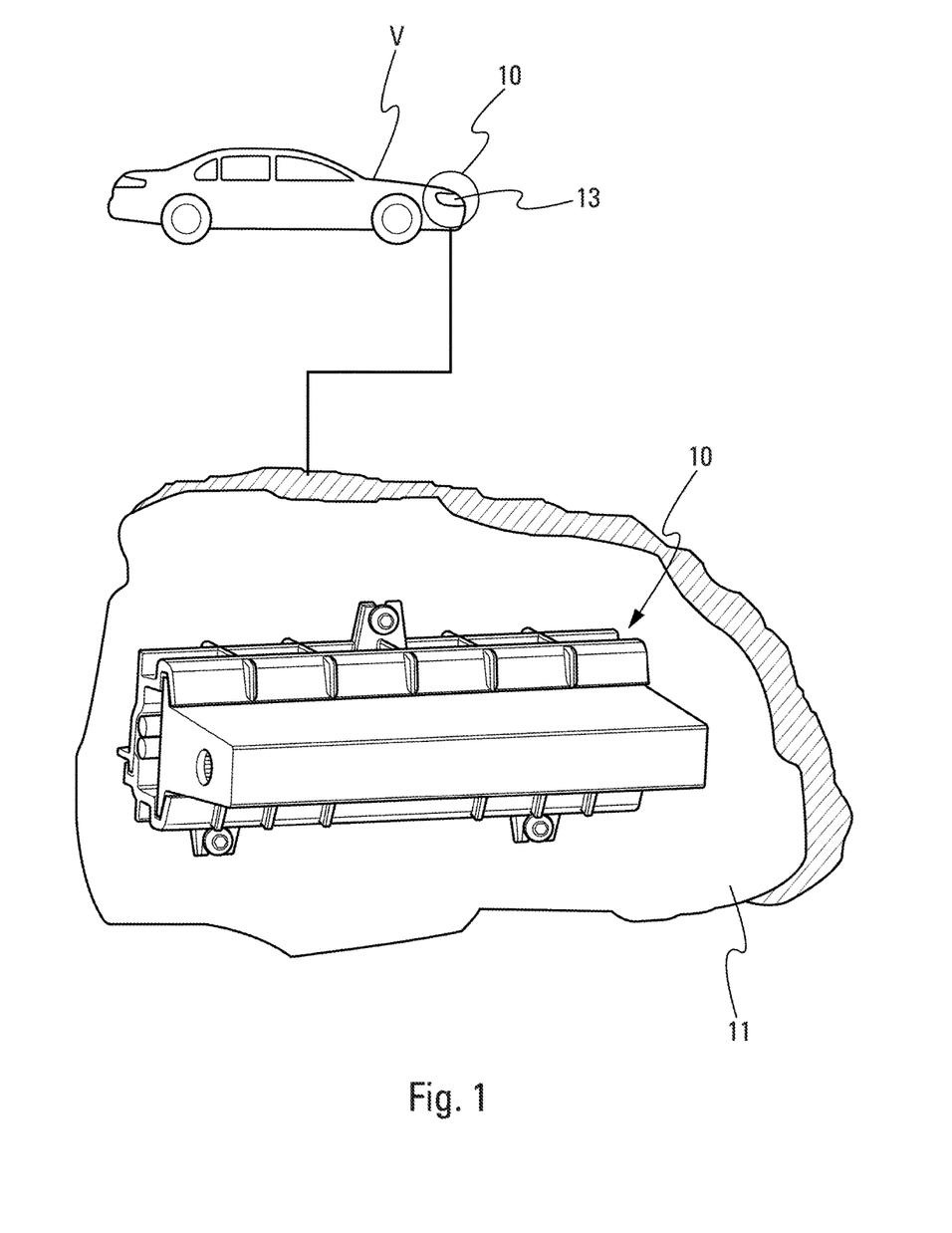
FIG. 1 is a partial fragmentary view showing a lighting assembly on a vehicle V.
Figure 2A:
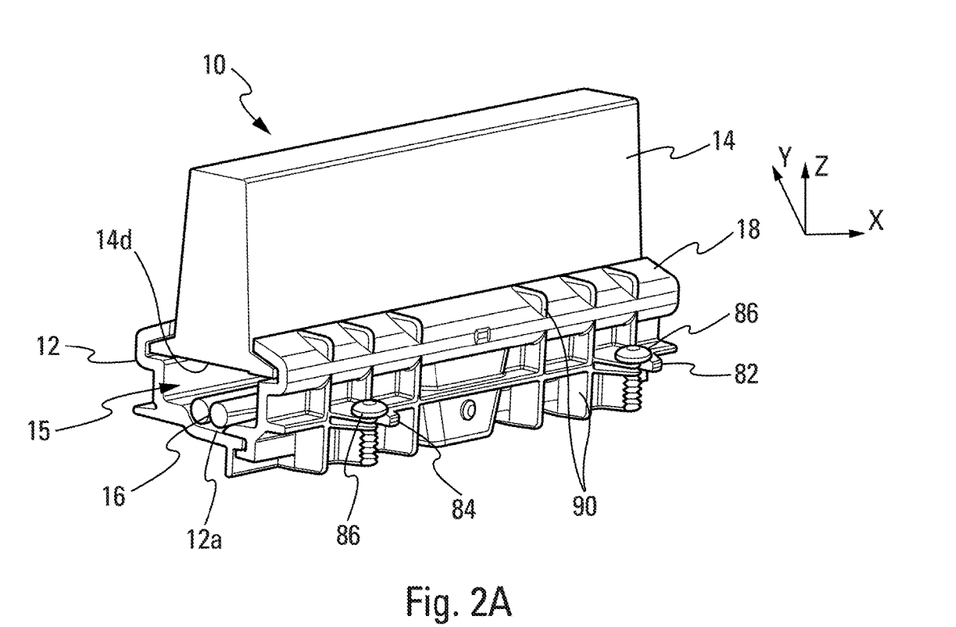
FIGS. 2A and 2B are perspective views showing various features of the lighting assembly shown in FIG. 1.
Figure 2B:
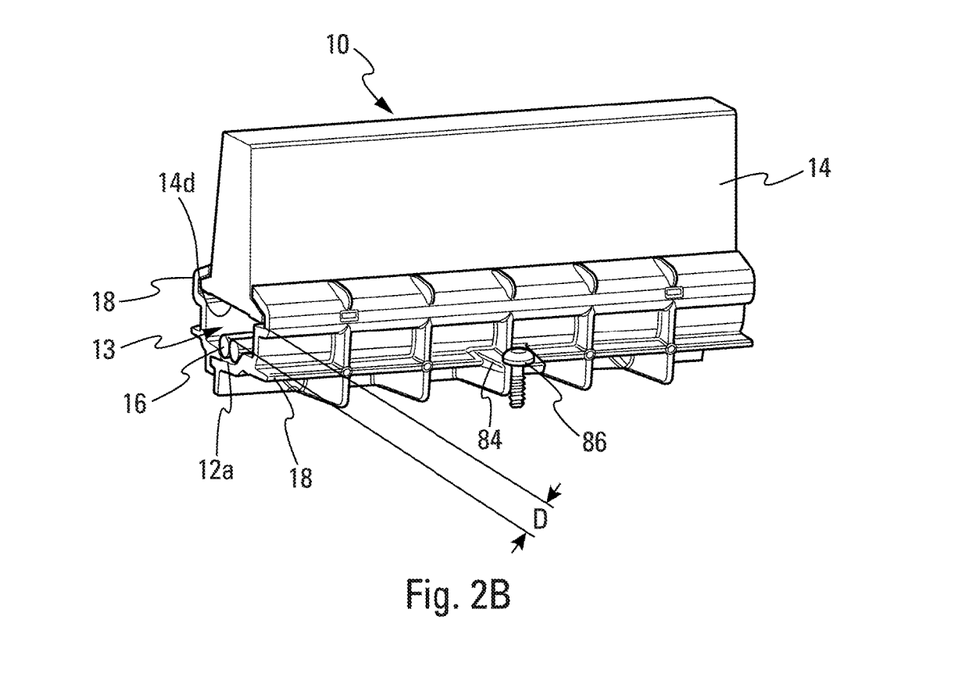

Again, it is important to note that once the bracket 18 is mounted and fastened to the reflector 12, the reflector 12, light pipe 16, light bar 14 and bracket 18 all become registered with respect to each other in the predetermined position illustrated in FIGS. 2A and 2B. Note that the clamping method provided and described herein causes an area A (FIG. 3) where the light bar 14 is secured to the reflector 12 to be closer to a center of gravity of the light bar 14. This is advantageous over performance and fatigue issues of the prior art designs because it reduces or eliminates fatigue failures.

Another advantageous feature is that the light pipe 16 and the light bar 14 are located and mounted to the same reflector 12 which improves optical registration of the light pipe 16 relative to the light entry surface 14d of the light bar 14. The light entry surface 14d of the light bar 14 may comprise a plurality of optics 14d1 that also facilitates transmission of light from a light source (e.g., an LED, organic light emitting diode, filament, arc, neon and/or fiber optics) through the light pipe 16, through the light bar 14 and out the exit surface 14e.

Another advantageous feature of the embodiment being described herein is that there are no fasteners or screws needed to mount the light bar 14 or the light pipe 16 to the reflector 12.

In the illustration being described, the bracket 18 may also comprise an internal surface 18b (FIG. 7A) that may be coated or treated such that it is a reflective surface so that the reflector 12 and bracket 18 cooperate to define a reflector that reflects the light provided by the light pipe 16 toward the light entry surface 14d of the light bar 14.

After the lighting assembly 10 is assembled, it is mounted onto the headlamp or tail lamp bezel or 11 (FIG. 1) of the vehicle V. Note that the bracket 18 comprises a plurality of integral or monolithically formed mounting tabs 82 (FIG. 2A) and the reflector 12 comprises at least one or a plurality of integral or monolithically formed mounting tabs 84. The mounting tabs 82 and 84 receive fasteners or screws 86 which are screwed directly into the headlamp bezel or housing 11 on the vehicle V.

It should be understood that both the reflector 12 and bracket 18 may comprise a plurality of reinforcing ribs, such as ribs 90 on the reflector 12 and ribs 92 on the bracket 18.

In the illustration being described, the light bar 14 is shown as having walls 14g (FIG. 6C) and 14h which generally converge from the light entry surface 14d to the exit surface 14e. However, it should be understood that the walls 14g and 14h could comprise other characteristics, such as curved surfaces, generally parallel surfaces or the like. Also, while the lighting assembly 10 has been shown as being generally elongated, it should be understood that the reflector 12 and bracket 18 may comprise other shapes, such as a curved or arcuate shape with any internal components, such as the light pipe 16 or light bar 14 being shaped complementarily. In other words, the light pipe 16 and light bar 14 do not have to be straight, for example, in response to a desired vehicle style or design.

It should be appreciated that in one embodiment as illustrated in FIG. 3, the reflector 12, the light bar 14, the bracket 18 and the light pipe 16 are arranged on top of each other and/or are stacked relative to one another in a generally vertical or generally horizontal plane. In one embodiment, the assembly is arranged in the following order: the reflector, the light bar, the bracket and then the light pipe.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A lighting assembly comprising:
   a reflector comprising a common locator element;
   a light bar for mounting on said reflector, the light bar comprising a first locating element;
   a light pipe for mounting on said reflector, the light pipe comprising a second locating element; and
   a bracket for securing both said light pipe and said light bar to said reflector, such that said light pipe, said light bar and said reflector become registered together in a predetermined position with the common locator element engaging both the first and second locating elements.

2. The lighting assembly as recited in claim 1 wherein said reflector comprises a first locator adapted to receive at least a first portion of said light bar.

3. The lighting assembly as recited in claim 2 wherein said first locator comprises a first elongated channel, said at least a first portion of said light bar comprises a clamping rib integrally formed in said light bar and configured to be received in said first elongated channel.

4. The lighting assembly as recited in claim 3 wherein said bracket comprises a second locator adapted to receive at least a second portion of said light bar.

5. The lighting assembly as recited in claim 4 wherein said second locator comprises a second elongated channel formed in said bracket, said at least a second portion of said light bar comprises a second clamping rib integrally formed in said light bar and configured to be received in said second elongated channel.

6. The lighting assembly as recited in claim 2 wherein said bracket comprises a second locator adapted to receive at least a second portion of said light bar.

7. The lighting assembly as recited in claim 6 wherein said second locator comprises an elongated channel formed in said bracket, said at least a second portion of said light bar comprises a clamping rib integrally formed in said light bar and configured to be received in said second elongated channel.

8. The lighting assembly as recited in claim 3 wherein said first elongated channel comprises at least one tuning rib for engaging said first portion of said light bar when said first portion is receiving in first elongated channel and adapted to register said light bar in said predetermined position.

9. The lighting assembly as recited in claim 3 wherein said first elongated channel comprises a plurality of tuning ribs for engaging said clamping rib of said light bar when said clamping rib is received in said first elongated channel and adapted to register said light bar in said predetermined position.

10. The lighting assembly as recited in claim 6 wherein said lighting assembly comprises a third locator for locating said light pipe in said predetermined position.

11. The lighting assembly as recited in claim 10 wherein said third locator comprises:
a first light pipe locator integral with said light pipe;
a second light pipe locator integral with said reflector;
said first and second light pipe locators cooperating to locate said light pipe on said reflector so that said light pipe becomes registered relative to said reflector and said light bar after said bracket is mounted on said reflector.

12. The lighting assembly as recited in claim 11 wherein said first light pipe locator comprises a first tab or projection integrally formed in said light pipe and said second light pipe locator comprises an opening in said reflector that is adapted to receive said first tab or projection.

13. The lighting assembly as recited in claim 11 wherein said first light pipe locator comprises a second tab or projection having a slot, said second light pipe locator comprising a projection adapted to be received in said slot to register said light pipe to said reflector.

14. The lighting assembly as recited in claim 12 wherein said first light pipe locator comprises a second tab or projection having a slot, said second light pipe locator comprising a reflector projection adapted to be received in said slot to register said light pipe to said reflector.

15. The lighting assembly as recited in claim 13 wherein said second tab or projection comprises a light bar locator for engaging said light bar when said light bar is mounted on said reflector and for locating said light bar relative to said light pipe.

16. The lighting assembly as recited in claim 14 wherein said light bar comprises a slotted light bar projection adapted to receive said reflector projection.

17. The lighting assembly as recited in claim 16 wherein second tab or projection comprises at least one surface that defines a stop against which said slotted light bar projection may abut to register said light bar to said light pipe.

18. The lighting assembly as recited in claim 14 wherein said light bar comprises a slotted light bar projection adapted to receive said reflector projection in order to register said light bar relative to said reflector and said light pipe.

19. The lighting assembly as recited in claim 1 wherein said light bar comprises a plurality of light bar locating projections that are received in a plurality of openings, respectively, in at least one of said reflector or said bracket in order to register said light bar in said predetermined position.

20. The lighting assembly as recited in claim 1 wherein when light pipe and said light bar are mounted on said reflector and said bracket is fixed to said reflector, said light pipe, said light bar and said reflector all become registered in said predetermined position in said assembly.

21. The lighting assembly as recited in claim 1 wherein said light bar comprises a first wall and a generally opposing second wall, said first and second walls being nonparallel.

22. The lighting assembly as recited in claim 1 wherein light bar is at least one of generally T-shaped or generally L-shaped in cross section.

\* \* \* \* \*